United States Patent
Seiche

(10) Patent No.: US 7,204,567 B2
(45) Date of Patent: Apr. 17, 2007

(54) METHOD AND DEVICE FOR DETECTING RESIDUAL PRESSURE IN A BRAKING SYSTEM IN PARTICULAR IN A BRAKING CYLINDER

(75) Inventor: Andreas Seiche, Gerlingen (DE)

(73) Assignee: Knorr-Bremse Systeme Fuer Nutzfahrzeuge GmbH, Munich (DE)

(*) Notice: Subject to any disclaimer, the term of this patent is extended or adjusted under 35 U.S.C. 154(b) by 273 days.

(21) Appl. No.: 10/483,560

(22) PCT Filed: Jul. 15, 2002

(86) PCT No.: PCT/EP02/07830

§ 371 (c)(1),
(2), (4) Date: Jul. 28, 2004

(87) PCT Pub. No.: WO03/006283

PCT Pub. Date: Jan. 23, 2003

(65) Prior Publication Data

US 2004/0245851 A1 Dec. 9, 2004

(30) Foreign Application Priority Data

Jul. 13, 2001 (DE) .............................. 101 34 153

(51) Int. Cl.
*B60T 8/88* (2006.01)

(52) U.S. Cl. .............................. 303/122.1; 303/122.14

(58) Field of Classification Search ................ 303/67, 303/82, 122.15, 122.14, 122.09, 122.1
See application file for complete search history.

(56) References Cited

U.S. PATENT DOCUMENTS

| | | | | |
|---|---|---|---|---|
| 3,869,178 A | * | 3/1975 | Day et al. ...................... 303/67 |
| 4,146,275 A | * | 3/1979 | Elliott et al. .................... 303/82 |
| 4,673,221 A | * | 6/1987 | Hayashi et al. ............. 303/9.75 |
| 4,889,395 A | * | 12/1989 | Fujita et al. .............. 303/115.1 |
| 5,310,974 A | * | 5/1994 | Churchill et al. ........... 200/566 |
| 5,619,110 A | * | 4/1997 | Sugimoto et al. ........... 318/450 |
| 5,675,317 A | * | 10/1997 | Ichikawa et al. ........... 340/507 |
| 6,007,165 A | * | 12/1999 | Sato et al. ................... 303/191 |
| 6,149,250 A | * | 11/2000 | Steffes et al. ............. 303/116.1 |
| 6,364,435 B1 | * | 4/2002 | Gronau et al. .............. 303/154 |
| 6,655,751 B2 | * | 12/2003 | Nakano ....................... 303/11 |
| 2001/0048243 A1 | * | 12/2001 | Nakano .................... 303/117.1 |

FOREIGN PATENT DOCUMENTS

| | | |
|---|---|---|
| DE | 34 16 744 | 11/1985 |
| DE | 34 23 944 | 1/1986 |
| DE | 35 01 179 | 7/1986 |
| DE | 41 32 767 | 4/1993 |
| DE | 41 36 978 | 5/1993 |
| DE | 42 27 084 | 2/1994 |
| EP | 0 795 449 | 9/1997 |
| GB | 2 270 130 | 3/1994 |
| WO | 97 32769 | 9/1997 |

* cited by examiner

*Primary Examiner*—Robert A. Siconolfi
(74) *Attorney, Agent, or Firm*—Crowell & Moring LLP

(57) ABSTRACT

According to the invention, the existence of residual pressure in the braking system is determined by means of continuous rough monitoring of the pressure in said system. If the existence of said residual pressure is established, then a fine monitoring process is carried out several times, whereby a pressure relieving body in the braking system is opened and sensed in order to determine whether the actual pressure is decreasing and if so to what extent.

16 Claims, 2 Drawing Sheets

METHOD AND DEVICE FOR DETECTING RESIDUAL PRESSURE IN A BRAKING SYSTEM IN PARTICULAR IN A BRAKING CYLINDER

BACKGROUND AND SUMMARY OF THE INVENTION

The present invention relates to a method of detecting residual pressure in a braking system, particularly in a brake cylinder.

In the case of conventional braking systems, residual pressure cannot be recognized by the braking system. However, even slight residual pressure may cause an application of the brake without creating a noticeable braking effect for the driver. An applied or "grinding" brake may cause overheating and, in the worst case, may result in a complete failure of the brake. As a rule, the driver can recognize a defect only in the case of a noticeable braking effect, which frequently has already been preceded by severe damage to the brake.

In the case of an electronically controlled pneumatic brake (EBS) for commercial vehicles, a desired pressure value is controlled into a brake cylinder, while a pressure regulating module is connected to the input side. This takes place in that a control pressure is controlled into a control chamber of the pressure regulating module by the use of two solenoid valves. By the use of an intake valve, the control chamber can be acted upon by storage pressure, which leads to a ventilation of the control chamber. By the use of the outlet valve, the control chamber can be connected with the atmosphere, that is, with the environment, in order to achieve a bleeding of the control chamber and, thus, a release of the brake. By the use of a relay piston, a pressure is controlled into the working chamber, which corresponds approximately to the pressure in the control chamber. The working chamber is connected with the brake cylinder. By the opening of a third solenoid valve, which is called a back-up valve, the control chamber can be connected with brake pressure of a conventional braking system, which is present for back-up purposes. The actual pressure in the working chamber is sensed via a pressure sensor. The electronic braking system monitors a possibly existing deviation between the actual-pressure signal and the defined desired pressure and correspondingly controls the intake valve or the outlet valve. In the unbraked condition, the intake valve and the outlet valve are closed and the back-up valve is opened.

As a result of diverse disturbing influences or defects in the braking system, a residual pressure may remain or be created in the braking system even if the driver does not operate the brake pedal. The residual pressure may be caused, for example, by a leaky intake valve, whereby a ram pressure is built up in the control chamber, which ram pressure cannot be completely bled by way of the back-up valve. Another cause may be a defect of the conventional braking system present "as a back-up", in which case, a pressure can then be built up in the control chamber, as required, by way of the back-up valve.

It is an object of the invention to provide a method and a device, respectively, for detecting residual pressure in a braking system, particularly in the working chamber of a brake cylinder.

This object is achieved by providing a method and device for detecting residual pressure in a braking system, particularly in a brake cylinder, characterized by (a) determining a suspicion of residual pressure when a difference between an adaptive pressure signal, whose time slope is caused to qualitatively follow a sensed actual pressure course, and a previously measured actual pressure ($U_{B0}$, $U_{B1}$) exceeds a defined limit value ($U_A-U_{B0}$); and (b) checking the suspicion of a residual pressure by operating a pressure relief element of the braking system and monitoring a possibly occurring drop of the sensed actual pressure. Advantageous embodiments and further developments of the invention are described herein.

The basic principle of the invention consists of determining by means of a continuous "rough" monitoring of the pressure in the braking system whether there is a suspicion of a residual pressure. If such a residual-pressure suspicion was determined, a precision monitoring takes place, as required, in a manner that is repeated several times. In this case, a pressure relief element of the braking system is opened up and sensed in order to determine whether the actual pressure is decreasing and, if so, to what extent.

This basic differentiation between a rough monitoring and a precision monitoring is required because the output signal of the pressure sensor alone is not sufficient for reliably detecting a residual pressure, that is, a defect in the braking system when a so-called "adaptive offset compensation" takes place. When the brake is not operated, that is, not released, the pressure in the braking system or the output signal of the pressure sensor depends on various influencing variables, such as the ambient temperature, the altitude or the atmospheric pressure. In addition, as a result of certain influences, a vacuum may sometimes temporarily be generated in the working chamber.

The "zero pressure level" (offset) of an intact braking system may therefore fluctuate within a certain bandwidth as a result of the above-mentioned disturbing influences. An "offset compensation" therefore has to be carried out; that is, the zero pressure level has to be adapted to the respective ambient condition.

By operating the outlet valve and analyzing (filtering) the pressure sensor voltage, a residual pressure detection can therefore be achieved. At a point in time, at which there is no residual pressure, a pressure sensor voltage is stored as a reference voltage. For this purpose, the outlet valve is opened in an initialization phase. During the operation, the pressure sensor voltage, that is, the pressure level existing in the braking system, may change as a function of different influences. As a result of a constant analysis of the (filtered) course of the pressure sensor voltage and a comparison with the reference voltage, which corresponds to a condition without residual pressure, a suspicion of a residual pressure can be determined. By the use of a further operation of the outlet valve, it can be detected whether an excess pressure actually exists in the braking system; that is, whether a residual pressure can be bled. If no bleeding takes place when the outlet valve is operated again, it is assumed that the zero pressure level has shifted, and the reference voltage is adapted correspondingly. If, in contrast, in the case of an operation of the outlet valve taking place possibly several times successively, a residual pressure bleeding takes place in every case, then a disturbance in the braking system can be assumed.

Practically, the following steps are carried out when the residual pressure monitoring is implemented:

Sensing of the actual pressure in the braking system and generating of a corresponding actual pressure signal;

during an initialization phase, opening of the pressure relief element, closing of the pressure relief element and storage of the actual pressure measured during the closing as a reference pressure signal;

generating an adaptive pressure signal whose signal course is formed by the constant filtering of the course of the actual-pressure signal, in which case, during the closing of the pressure relief element, the adaptive pressure signal is set to an initial value which is equal to that of the actual pressure signal;

monitoring of the difference between the reference pressure signal and the adaptive pressure signal and another opening of the pressure relief element when the difference is greater than a defined limit value;

storing of the actual pressure measured during the repeated opening as a starting pressure signal;

determining that no residual pressure is present when the following applies after the repeated opening:

actual pressure signal>starting pressure signal−limit value or a residual pressure is present when the following applies after another opening:

actual pressure signal<starting pressure signal−limit value.

The adaptive pressure signal is formed by filtering the actual pressure signal. The course of the adaptive pressure signal corresponds qualitatively, that is, "roughly", to the actual pressure signal, in which case, for example, when the actual pressure signal rises, the adaptive pressure signal also rises and vice-versa. In this case, one or several functional or relational "filtering rules" may be defined.

When, during the rough monitoring, the adaptive pressure signal and the reference pressure signal diverge and a defined difference (limit value) is exceeded, it is suspected that a residual pressure has formed in the braking system. When there is a suspicion of a residual pressure, a precision monitoring is carried out.

For this purpose, an "outlet valve" of the braking system is actuated, so that a possibly existing excess pressure can escape. If no "noticeable" pressure drop takes place, it is assumed that the braking system is in order and only environmental conditions, such as the temperature, the atmospheric pressure, etc., have changed. Therefore, when the bleeder valve is closed, the reference pressure level is changed corresponding to the "new normal conditions"; that is, the reference pressure level is set to the level of the actually measured actual pressure. Also, the "new initial value" for the adaptive pressure signal is set to this pressure level.

If, in contrast, an excess pressure is present in the braking system, which escapes when the bleeder valve is opened, and the measured actual value drops by more than the defined limit value, the reference pressure signal is retained unchanged, and the "old" reference pressure level is also set as the new initial value for the adaptive pressure signal. If such a residual pressure bleeding is determined several times successively, it can be assumed with relatively high certainty that a disturbance of the braking system is actually present, and a warning signal is generated.

Among others, the following advantages are achieved by the use of the invention:

Even a slight residual pressure can be detected;

The residual pressure monitoring takes place permanently during an unbraked drive, whereby a forming residual pressure can be detected before the brake overheats;

A detection of residual pressure can be achieved in all cases; that is, in the case of an abrupt formation of residual pressure as well as in the case of a creeping formation of residual pressure over an extended period of time;

The additional stress to the bleeding valve is very low because the number of additional operations is low; and The residual pressure monitoring can be used for aiding the pressure sensor offset compensation.

The invention has a very broad usage range and can generally be used when:

a magnitude of a technical system depends on different influencing variables;

it should be detectable at any time whether a change of the magnitude is caused by a certain influencing variable;

the possibility exists of acting upon a magnitude and detecting by the effect whether the preceding change of the magnitude was caused by a certain influencing variable;

the possibility of influencing the magnitude is to be used only rarely or exists only rarely.

In the following, the invention will be explained in detail by means of an embodiment in connection with the drawing.

DETAILED DESCRIPTION OF THE DRAWINGS

Figure 1:
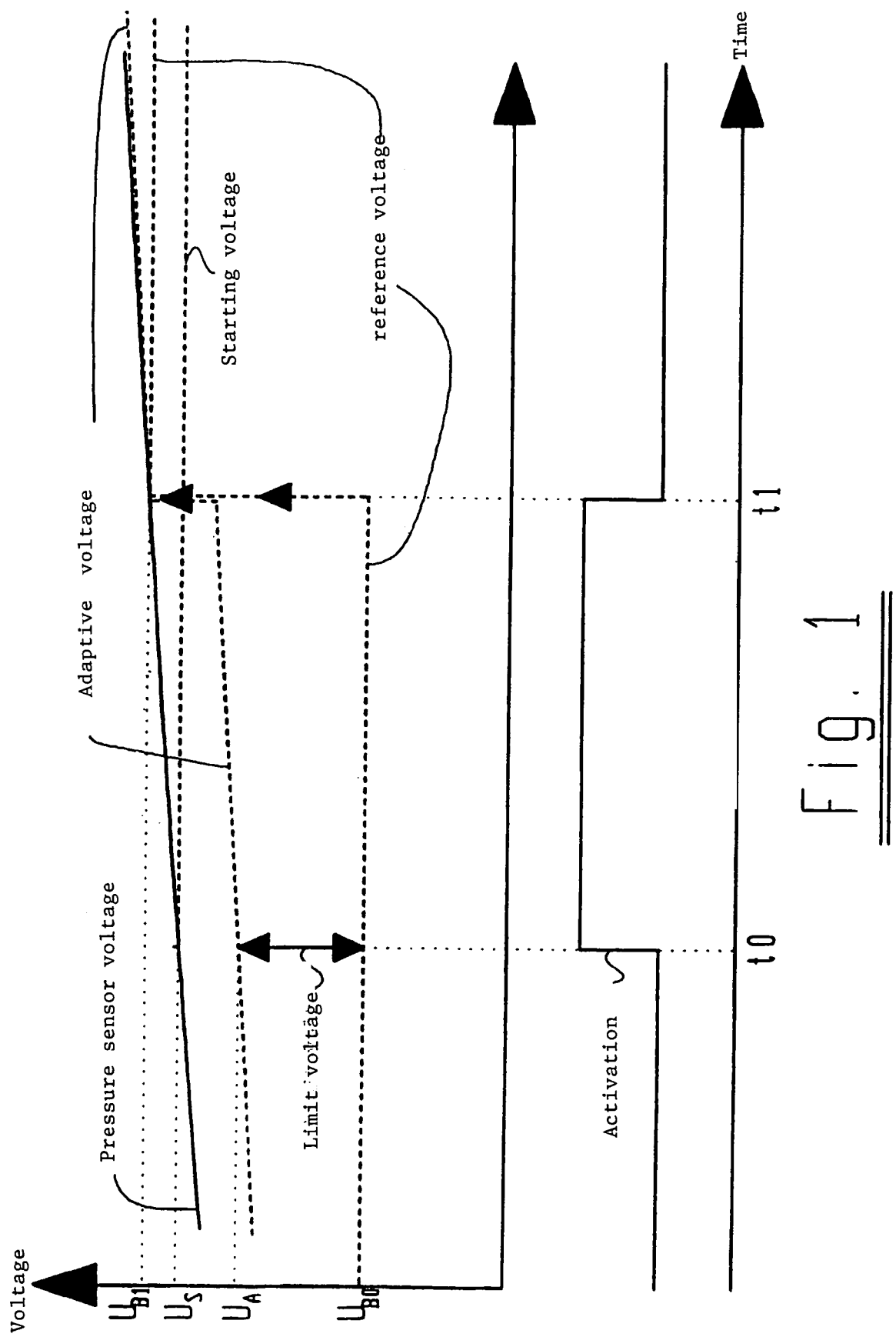
FIG. 1 is a view of a pressure relief process under normal operation without any residual pressure.

In the upper part of the diagram, FIG. 1 illustrates different pressure courses of the braking system in a "normal operating phase", and in the lower part of the diagram, FIG. 1 illustrates the switching condition of an outlet valve of the braking system, in which case, the opening of the outlet valve takes place at the point in time t0; the holding-open takes place during the time period ([t0, t1]; and the closing takes place at the point in time t1.

All pressure signals are measured and processed here as electric voltage signals.

Before the normal operating phase described in FIG. 1, an initialization phase takes place; for example, in each case, before the start of the drive or when the ignition is switched on. For initializing the residual pressure monitoring system, the outlet valve is opened for a limited time; that is, the control chamber is bled. At the start of the opening time, the pressure sensor voltage is stored as the starting voltage. Subsequently, it is checked whether the actual pressure, that is, the pressure sensor voltage drops, below a voltage value "starting voltage minus a limit voltage". The limit voltage is a defined voltage corresponding to a pressure above which residual pressures can be detected.

When no residual pressure is present, the pressure sensor voltage does not drop or does not noticeably drop during the opening of the outlet valve; that is, the following applies:

Pressure sensor voltage>starting voltage−limit voltage.

The outlet valve is closed after a defined maximal opening time. The pressure sensor voltage is stored at the end of the opening time as reference voltage $U_{B0}$ (FIG. 1). The reference voltage $U_{B0}$ is therefore the voltage without residual pressure at the point in time of the operation of the outlet valve at the end of the initialization phase. Furthermore, an adaptive voltage is formed, which varies with time and whose initial value is set to the value of the reference voltage $U_{B0}$. The following therefore applies:

Reference voltage $U_{B0}$=pressure sensor voltage at the end of the opening time and initial value of the adaptive voltage=reference voltage $U_{B0}$.

If a residual pressure is present, the pressure sensor voltage drops (noticeably) during the opening of the outlet valve; that is, the following applies:

Pressure sensor voltage<starting voltage−limit voltage.

The outlet valve is closed during a pressure drop, which corresponds at least equal to the limit voltage. The following defined:

Reference voltage=pressure sensor voltage−limit voltage adaptive voltage=reference voltage.

The low reference voltage permits further operations of the outlet valve, which may lead to the detection of defects.

Figure 2:
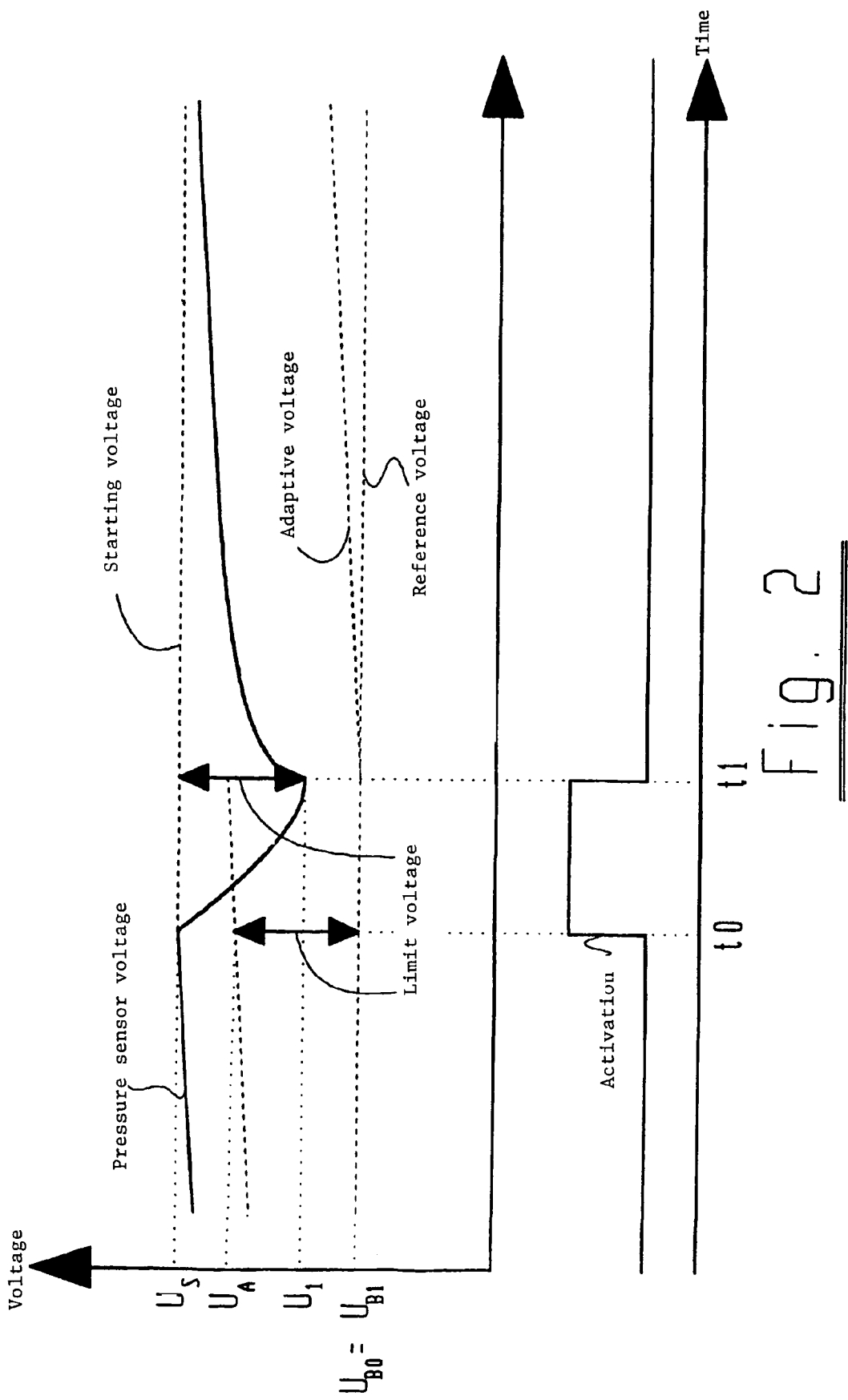
FIG. 2 is a view of a pressure relief process in the normal operation with residual pressure.

Following the initialization phase, the normal operating phase takes place, which is described in FIGS. 1 and 2. The adaptive voltage is caused to constantly follow the pressure sensor voltage in a filtered manner. The pressure sensor voltage may change for different reasons; for example, because of changes of the ambient conditions and particularly because of a building-up residual pressure. It is constantly monitored whether the adaptive voltage is higher than the reference voltage by the amount of the limit voltage. When the reference voltage and the adaptive voltage diverge and the following applies:

Adaptive voltage=reference voltage+limit voltage, residual pressure is suspected. The actually present pressure sensor voltage is stored as starting voltage, and the outlet valve is actuated subsequently.

It is now possible that a residual pressure is present or is not present.

a) No Residual Pressure Is Present

The pressure sensor voltage does not (significantly) fall during the opening time ([t0, t1] of the outlet valve; that is, the following applies:

Pressure sensor voltage>starting voltage−limit voltage.

When the maximal opening time [t1−t0] has been reached, the outlet valve is closed again. The pressure sensor voltage at the end of the opening time is set as the new reference voltage $U_{B1}$. Correspondingly, a new initial value is set for the adaptive voltage which is equal to the new reference voltage $U_{B1}$. The following therefore applies:

Reference voltage=pressure sensor voltage at the end of the opening time

Adaptive voltage=reference voltage.

The reference voltage is thereby adapted to the momentary pressure sensor voltage without residual pressure.

b) Residual Pressure Is Present (FIG. 2)

The pressure sensor voltage drops noticeably during the opening time [t1−10]; that is, the following applies:

Pressure sensor voltage<starting voltage $U_S$−limit voltage ($U_S$−$U_1$).

As soon as the pressure sensor voltage has dropped by at least the limit voltage; that is, when the voltage $U_1$ has been reached, the outlet valve is closed. The following is defined:

Reference voltage remains unchanged; that is, $U_{B0}$=$U_{B1}$

Initial value of the adaptive voltage=reference voltage.

The unchanged reference voltage permits further actuations of the outlet valve which possibly lead to another confirmation of the defect detection. After a certain definable number of operations of the outlet valve, at which a residual pressure bleeding takes place, it can in all probability be concluded that a residual pressure defect is in fact present in the braking system. In this case, it should be observed that the time from the first defect-recognizing operation of the outlet valve to a defect report is selected to be sufficiently brief in order to avoid an overheating of the brake.

The invention claimed is:

1. A method for detecting an existence of residual pressure in a braking system that senses an actual pressure in the system and generates a corresponding actual pressure signal, the method comprising the acts of:
   monitoring whether a difference between an adaptive pressure signal, whose time slope is caused to qualitatively follow a sensed actual pressure course, and a previously measured actual pressure ($U_{B0}$, $U_{B1}$) exceeds a defined limit value ($U_A$−$U_{B0}$); and
   if the defined limit value is exceeded, checking for the existence of the residual pressure by operating a pressure relief element of the braking system and monitoring for a potential drop of the sensed actual pressure indicative of the existence of the residual pressure.

2. The method according to claim 1, wherein the acts of monitoring and checking are carried out by:
   a) sensing the actual pressure in the braking system and generating a corresponding actual pressure signal,
   b) opening the pressure relief element,
   c) closing the pressure relief element and storing the actual pressure measured during the closing as a reference pressure signal ($U_{B0}$, $U_{B1}$),
   d) generating the adaptive pressure signal whose signal course is formed by a constant filtering of the course of the actual-pressure signal, in which case, during the closing of the pressure relief valve, the adaptive pressure signal is set to an initial value which is equal to that of the reference pressure signal ($U_{B0}$, $U_{B1}$),
   e) monitoring the difference between the reference pressure signal ($U_{B0}$, $U_{B1}$) and the adaptive pressure signal and another opening of the pressure relief valve, when the difference is greater than the defined limit value ($U_A$−$U_{B0}$),
   f) storing the actual pressure measured during the repeated opening as a starting pressure signal ($U_S$),
   g) determining that no residual pressure is present when, after the repeated opening, actual pressure signal>starting pressure signal ($U_S$)−limit value ($U_A$−$U_{B0}$), and determining that a residual pressure is present when after another opening $$\text{actual pressure signal} < \text{starting pressure signal } (U_S) - \text{limit value } (U_A - U_{B0}).$$

3. The method according to claim 2, wherein the time duration (t1–10) between the opening in Step b) and the closing in Step c) is a constant, firmly defined time period.

4. The method according to claim 2, wherein according to Step g), the pressure relief element is closed again and Steps c)–g) are implemented again if it was previously determined in Step g) that no residual pressure is present.

5. The method according to claim 3, wherein according to Step g), the pressure relief element is closed again and Steps c)–g) are implemented again if it was previously determined in Step g) that no residual pressure is present.

6. The method according to claim 4, wherein the repeated closing of the pressure relief element takes place when the actual pressure has dropped by at least the limit value ($U_A - U_{B0}$) or after a firmly defined time period, when the actual pressure has dropped up to its expiration by less than the limit value ($U_A - U_{B0}$).

7. The method according to claim 2, wherein if a residual pressure was determined in Step g), the reference pressure signal ($U_{B0}$, $U_{B1}$) is kept unchanged, and Steps d)–g) are implemented again.

8. The method according to claim 3, wherein if a residual pressure was determined in Step g), the reference pressure signal ($U_{B0}$, $U_{B1}$) is kept unchanged, and Steps d)–g) are implemented again.

9. The method according to claim 4, wherein if a residual pressure was determined in Step g), the reference pressure signal ($U_{B0}$, $U_{B1}$) is kept unchanged, and Steps d)–g) are implemented again.

10. The method according to claim 6, wherein if a residual pressure was determined in Step g), the reference pressure signal ($U_{B0}$, $U_{B1}$) is kept unchanged, and Steps d)–g) are implemented again.

11. The method according to claim 2, wherein a residual pressure warning signal is generated when a residual pressure was determined a defined number of times according to Step g).

12. The method according to claim 1, wherein the pressure in the braking system is sensed by a pressure sensor which supplies an electric voltage as an output signal, and in that all pressure signals to be processed and the limit value ($U_A - U_{B0}$) are processed as electric voltage signals.

13. The method according to claim 2, wherein Step a) is constantly carried out during unbraked driving.

14. The method according to claim 2, wherein Steps b) and c) are carried out in an initialization phase.

15. The method according to claim 2, wherein Steps d)–g) are carried out in a normal operating phase.

16. The method according to claim 1, wherein the pressure relief element is an outlet valve which is assigned to a pressure control module of the braking system.

* * * * *